(12) United States Patent
Wu et al.

(10) Patent No.: US 12,450,685 B2
(45) Date of Patent: Oct. 21, 2025

(54) IMAGE MORPHING ADAPTION METHOD AND APPARATUS

(71) Applicant: SAMSUNG ELECTRONICS CO., LTD., Suwon-si (KR)

(72) Inventors: Di Wu, Nanjing (CN); Siyuan Huang, Nanjing (CN); Ye Sun, Nanjing (CN); Lei Li, Nanjing (CN); Lie Zou, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 224 days.

(21) Appl. No.: 18/199,127

(22) Filed: May 18, 2023

(65) Prior Publication Data

US 2023/0289918 A1  Sep. 14, 2023

Related U.S. Application Data

(63) Continuation of application No. PCT/KR2021/018652, filed on Dec. 9, 2021.

(30) Foreign Application Priority Data

Dec. 10, 2020  (CN) .......................... 202011456034.3

(51) Int. Cl.
*G06T 3/18* (2024.01)
*G06T 3/40* (2006.01)
*G06T 3/60* (2006.01)

(52) U.S. Cl.
CPC .............. *G06T 3/18* (2024.01); *G06T 3/40* (2013.01); *G06T 3/60* (2013.01)

(58) Field of Classification Search
CPC .... G06T 3/18; G06T 3/40; G06T 3/60; H04N 5/2628; H04N 21/4402; H04N 21/4312; H04N 21/440272; H04N 21/47205
See application file for complete search history.

(56) References Cited

U.S. PATENT DOCUMENTS

| | | | |
|---|---|---|---|
| 7,359,003 B1 * | 4/2008 | Knighton | H04N 23/661 348/E5.025 |
| 8,089,518 B2 | 1/2012 | Fahn et al. | |
| 8,358,321 B1 * | 1/2013 | Weidner | G06F 1/1686 345/619 |
| 9,843,729 B2 | 12/2017 | Nichols et al. | |
| 10,228,766 B2 | 3/2019 | Bhesania et al. | |
| 10,552,946 B2 | 2/2020 | Furukawa | |

(Continued)

FOREIGN PATENT DOCUMENTS

| | | |
|---|---|---|
| CN | 103489155 A | 1/2014 |
| CN | 111010476 A | 4/2020 |

(Continued)

OTHER PUBLICATIONS

Office Action issued Jul. 11, 2022 by Chinese Patent Office for Chinese Patent Application No. CN202011456034.3 filed on Dec. 10, 2020.

(Continued)

*Primary Examiner* — Ryan R Yang

(74) *Attorney, Agent, or Firm* — Sughrue Mion, PLLC

(57) ABSTRACT

Disclosed herein are an image morphing adaption method and apparatus. The method includes, during a rotation process of a display device, processing, by rotating and then clipping, an image to be displayed at at least one morphing adaption processing time, and displaying the processed image at the at least one morphing adaption processing time. A rotation angle of the image is substantially equal to a rotation angle of the display device at the corresponding time, a rotation direction of the image is opposite to a rotation direction of the display device, the morphing adaption processing time is determined based on a preset morphing adaption processing frequency, and the morphing adaption processing frequency is determined by down-conversion based on a current screen refresh frequency. According to such a method, images displayed by the display device during the rotation process substantially (Continued)

match the view angle of users, improving a viewing experience.

13 Claims, 3 Drawing Sheets

(56) References Cited

U.S. PATENT DOCUMENTS

| | | | |
|---|---|---|---|
| 2004/0239792 A1 | 12/2004 | Shibutani et al. | |
| 2010/0066763 A1* | 3/2010 | MacDougall | G06F 1/1626 |
| | | | 345/656 |
| 2013/0057571 A1* | 3/2013 | Harris | G06F 1/1613 |
| | | | 345/619 |
| 2014/0333671 A1 | 11/2014 | Phang et al. | |
| 2016/0313781 A1 | 10/2016 | Jeon et al. | |
| 2016/0364017 A1 | 12/2016 | Wang | |
| 2020/0293255 A1 | 9/2020 | Lim et al. | |
| 2021/0360168 A1* | 11/2021 | Zhao | H04N 5/265 |

FOREIGN PATENT DOCUMENTS

| | | | | | |
|---|---|---|---|---|---|
| CN | 202010664929 A | * | 7/2020 | | H04N 21/442 |
| CN | 111683282 A | | 9/2020 | | |
| CN | 111800589 A | * | 10/2020 | | H04N 23/80 |
| JP | 2006-259358 A | | 9/2006 | | |
| JP | 2006245726 A | * | 9/2006 | | H04N 23/63 |
| JP | 2011-71572 A | | 4/2011 | | |
| JP | 2011071572 A | * | 4/2011 | | H04N 5/232 |
| JP | 5814697 B2 | | 11/2015 | | |

OTHER PUBLICATIONS

International Search Report (PCT/ISA/210) issued by the International Searching Authority on Mar. 25, 2022 in corresponding International Application No. PCT/KR2021/018652.

Written Opinion (PCT/ISA/237) issued by the International Searching Authority on Mar. 25, 2022 in corresponding International Application No. PCT/KR2021/018652.

* cited by examiner

IMAGE MORPHING ADAPTION METHOD AND APPARATUS

CROSS-REFERENCE TO RELATED APPLICATIONS

This application is a bypass continuation application of International Patent Application No. PCT/KR2021/018652, filed on Dec. 9, 2021, which is based on and claims priority to Chinese Patent Application No. 202011456034.3, filed on Dec. 10, 2020 with the China National Intellectual Property Administration, the disclosures of each of which are incorporated by reference herein in their entireties.

BACKGROUND

1. Field

The disclosure relates to the technical field of computers, in particular to an image morphing adaption method and apparatus.

2. Description of Related Art

According to traditional video display schemes, video images are typically displayed by display devices in a landscape direction. However, with the popularization of smart phones, more and more videos in a portrait direction are required to adapt to smart phones held vertically. For example, most videos on existing common video social network sites are displayed in the portrait direction. The current situation of co-existence of videos in the landscape direction and videos in the portrait direction puts forward more requirements for traditional display devices, and leads to the emergence of rotatable display devices, such as rotatable TV.

SUMMARY

It is an aspect of the disclosed method and apparatus to improve the viewing experience of users during the rotation process of display devices.

In accordance with certain embodiments of the present disclosure, an image morphing adaption method is provided. The method includes, during a rotation process of a display device, processing, by rotating and then clipping, an image to be displayed at at least one morphing adaption processing time; and displaying the processed image at the at least one morphing adaption processing time. A rotation angle of the image is substantially equal to a corresponding rotation angle of the display device at the corresponding time, a rotation direction of the image is opposite to a rotation direction of the display device, the morphing adaption processing time is determined based on a preset morphing adaption processing frequency, and the morphing adaption processing frequency is determined by down-conversion based on a current screen refresh frequency.

In accordance with other embodiments of the present disclosure, an image morphing adaption apparatus for a display device is provided. The apparatus includes a morphing processing module configured to process, during a rotation process of the display device, by rotating and then clipping, an image to be displayed at a morphing adaption processing time; and a display module used for displaying the processed image at the morphing adaption processing time. A rotation angle of the image is substantially equal to a corresponding rotation angle of the display device at the corresponding time, a rotation direction of the image is opposite to a rotation direction of the display device, the morphing adaption processing time is determined based on a preset morphing adaption processing frequency, and the morphing adaption processing frequency is determined by down-conversion based on a current screen refresh frequency.

In accordance with still other embodiments of the present disclosure, a non-transitory computer-readable storage medium is provided. The storage medium has at least one computer-readable instruction stored therein, which, when executed by at least one processor, causes the at least one processor to, during a rotation process of a display device, process, by rotating and then clipping, an image to be displayed at at least one morphing adaption processing time; and display the processed image at the at least one morphing adaption processing time. A rotation angle of the image is substantially equal to a corresponding rotation angle of the display device at the corresponding time, a rotation direction of the image is opposite to a rotation direction of the display device, the morphing adaption processing time is determined based on a preset morphing adaption processing frequency, and the morphing adaption processing frequency is determined by down-conversion based on a current screen refresh frequency.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

To clarify various objectives, technical solutions, and advantages of various embodiments of the disclosure, such will be described in further detail below in conjunction with the accompanying drawings and embodiments.

It will be recognized by those of skill in the art that perfect equality between values is not practical to achieve in a physical space, nor in attempts to reflect physical space in a measurement, computation, or mathematical representation. Furthermore, it will be recognized that flawless precision is not necessary to achieve the effects disclosed herein. As such, in places herein, values will be described as "substantially" equal, "consistent with" each other, or similar, to represent an expected margin of error reflective of the limits of the employed measuring sensors, processors, displays, and other components.

It has been determined that existing rotatable display devices have the following problem: images displayed by existing displays rotate along with the rotation of the displays during the rotation process, that is, the images displayed by the displays incline continuously along with the rotation of the displays, so users will unconsciously tilt their heads along with the images to view the images, thus reducing the video viewing experience of the users. The problem of unsatisfying viewing experience will be highlighted particularly during the rotation process of large display devices (such as rotatable TVs) because of their long rotation time.

A solution was therefore sought and developed, and is described in the present disclosure. According to various embodiments of this solution, an image to be displayed at each of a series of morphing processing times may be processed according to the current rotation angle of the display device during the rotation process of the display device, and then the processed image may be displayed, where the morphing adaption processing time may be determined based on the preset morphing adaption processing frequency, and the preset morphing adaption processing frequency may be obtained by down-conversion based on the current screen refresh frequency. In this way, images displayed by the display device during the rotation process may substantially match or otherwise remain consistent with the view angle of users, thus effectively improving the viewing experience of the users.

Figure 1:
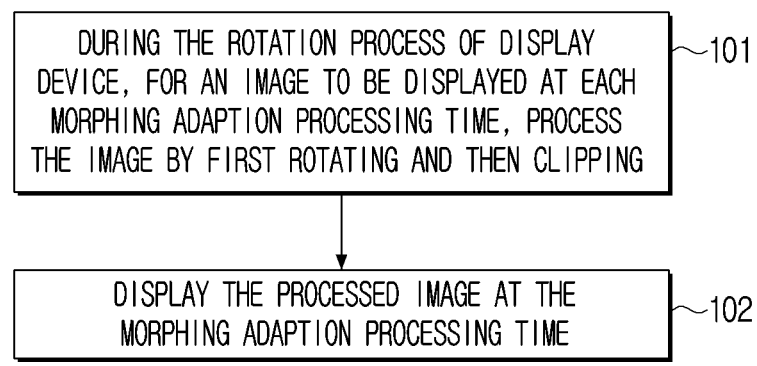
FIG. 1 is a flow diagram of an image morphing adaption method according to an embodiment of the disclosure.

FIG. 1 is a flow diagram of an image morphing adaption method according to an embodiment of the disclosure. As shown in FIG. 1, an image morphing adaption method in may include:

Operation 101: an image to be displayed at each morphing adaption processing time during the rotation process of a display device is processed by rotating and then clipping, and the processed image is displayed at the morphing adaption processing time.

A rotation angle of the image may be equal, or substantially equal, to a rotation angle of the display device at the corresponding time, and a rotation direction of the image may be opposite to a rotation direction of the display device.

The morphing adaption processing time may be determined based on a preset morphing adaption processing frequency.

The morphing adaption processing frequency may be obtained by down-conversion based on the current screen refresh frequency. The morphing adaption processing time may be determined by down-conversion based on the current screen refresh frequency, such that the display frequency of images matches or substantially matches the screen refresh frequency.

In this way, the update frequency of images will not be too high, and the processing overhead is effectively reduced; and a smooth transitional display effect is realized such that display of an image meets visual requirements of users, and thus, the image viewing experience of the users is improved.

In Operation 101, during the rotation process of the display device, before an image is displayed at each morphing adaption processing time, the image may be morphed in advance; that is, the image may be rotated and then clipped to be processed to ensure that the image displayed at each morphing adaption processing time will not rotate with the rotation of the display device but will be kept consistent, in the horizontal direction, with an image displayed when the display device is upright, such that the image displayed by the display device matches the view angle of users, thus effectively improving the viewing experience of the users.

In certain embodiments, the morphing adaption processing frequency may be obtained by:

$$f_1 = \max((f_0 \times a), b) \quad \text{(Eq. 1)}$$

Wherein $f_1$ is the morphing adaption processing frequency, $f_0$ is the current screen refresh frequency, a is a preset down-conversion coefficient for a value 0<a<1, and b is a preset minimum morphing adaption processing frequency. Suitable values for a and b may be set those skilled in the art according to requirements of the display device. For example, a may be set to ½ or ⅓, and b may be set to 30 Hz. The morphing adaption processing frequency may be obtained at the start of the rotation process, or at any other time in advance of the processing of the image.

Eq. 1 thereby represents that a maximum value is selected from $f_0 \times a$ and b to be used as $f_1$ to ensure that the value of $f_1$ is at least a minimum morphing adaption processing frequency (that is, at least b).

Operation 102: the processed image is displayed at the morphing adaption processing time.

In this operation, the image subjected to morphing adaption processing may be displayed at each morphing adaption processing time, such that images displayed during the rotation process of the display device are maintained at a substantial match to the view angle of users with each such display.

In certain embodiments, in Operation 101, the image to be displayed at each morphing adaption processing time may be processed by rotation and clipping through the following sub-operations:

Sub-Operation x1: a next morphing adaption processing time t+1 is determined at each morphing adaption processing time t during the rotation process of the display device according to the preset morphing adaption processing frequency.

In this sub-operation, the next morphing adaption processing time t+1 may be determined at the morphing adaption processing time t according to the current morphing adaption processing frequency to further acquire an image to be displayed at the next morphing adaption processing time t+1 and perform morphing processing on the image, such that the image displayed at the morphing adaption processing time t+1 is an image subjected to morphing adaption processing, thus ensuring that the image displayed at the morphing adaption processing time t+1 is consistent, in the horizontal direction, with an image displayed when the display device is upright.

Sub-Operation x2: an image $P_{t+1}$ to be displayed at the time t+1 is acquired.

Sub-Operation x3: a corresponding rotation angle θ of the display device at the time t+1 is predicted according to a current rotation angle and rotational angular velocity of the display device.

Sub-Operation x4: a first size is calculated according to the rotation angle θ, a width w of the image $P_{t+1}$ and a height h of the image $P_{t+1}$.

In certain embodiments, in Sub-Operation x4, the first size may be calculated through the following sub-operations:

Sub-Operation x41: a width $W_1$ of the first size is calculated according to:

$$W_1 = w \times \frac{\sin(\alpha + \theta)}{\sin \alpha} \quad \text{(Eq. 2)}$$

Sub-Operation x42: a height $H_1$ of the first size is calculated according to:

$$H_1 = h \times \frac{\sin(\alpha + \theta)}{\sin \alpha} \quad \text{(Eq. 3)}$$

Wherein $\alpha = \tan^{-1}(h/w)$.

Sub-Operation x5: the image $P_{t+1}$ is scaled according to a preset image scaling ratio r to obtain an image $P'_{t+1}$.

Sub-Operation x6: the image $P'_{t+1}$ is converted into an image of the first size.

In certain embodiments, in Sub-Operation x6, the image $P'_{t+1}$ may be converted into an image of the first size specifically through the following sub-operations:

Sub-Operation x61: the image $P'_{t+1}$ is placed at a central area of a screen, wherein the screen is of the first size.

Sub-Operation x62: a blank area (that is, an area which is left uncovered by the image $P'_{t+1}$) in the current screen, if any, is filled to obtain the image of the first size.

Here, the specific filling method may be by tiling or Gaussian Blur, but is not limited thereto.

Sub-Operation x7; the image obtained by conversion is rotated in a direction opposite to the rotation direction of the display device according to the rotation angle θ;

In this sub-operation, the image of the first size obtained in Sub-Operation x6 may be rotated in a direction opposite to the rotation direction of the display device, such that the display direction of the image is kept substantially consistent with the direction of a display plane to ensure that images displayed during the rotation process of the display device substantially match the view angle of users, thus effectively improving the viewing experience of users.

Sub-Operation x8: the image obtained by conversion is clipped to obtain an image of a second size.

In certain embodiments, in Sub-Operation x8, the image obtained by conversion may be clipped to obtain an image of a second size specifically through the following sub-operations:

Sub-Operation x81: a current clip center is determined according to a preset clip strategy.

Sub-Operation x82: the rotated image is clipped according to the clip center with the second size as an image clip size.

In certain embodiments, to ensure that the main contents of images are displayed to the maximum extent, the clip strategy may use the image center as the clip center. In other embodiments, a key area of an image of a video frame may be detected according to a preset key area detection strategy for use as the clip center.

In certain embodiments, the second size may be consistent with an original size of the image, that is, a width of the second size is w, and a height of the second size is h.

Furthermore, in actual application, the rotation of the display device may be triggered by different trigger mechanisms.

For example, in certain embodiments, the display device may be triggered to rotate correspondingly according to a display direction switch request from a user. That is, when the display device detects a display direction switch request from a user, it may be determined that the display device needs to be rotated currently, and a corresponding rotation process of the display device may be triggered and performed.

Preferably, considering that a video may include video frames both in a landscape direction and in a portrait direction in actual application, to realize a better video display effect, in certain embodiments, the corresponding rotation process of the display device may be automatically triggered and performed as follows:

For each frame of image to be displayed currently, whether a current display direction of the display device is consistent with an image display direction of a corresponding frame of image to be displayed a T time later is determined; and if not, it is determined that the display device needs to be rotated, and the corresponding rotation process is triggered; wherein T is a time needed for completing the rotation process of the display device.

Through the above-described method, when each frame of image is displayed, whether an image display direction of a corresponding frame of image to be displayed a T time later is consistent with a current display direction of the display device may be determined to detect frames in different display directions and to timely trigger the display direction of the display device to be switched, such that the display direction of the display device may remain consistent with the display direction of each frame of image to be displayed, thus further realizing the adaption of the video display direction in the video playing process, ensuring that the image effect will not be affected by the rotation of the display device in the display direction switching process of the display device, and effectively improving the video playing effect.

The display direction of the display direction may be designated as one of a landscape direction and a portrait direction.

In actual application, the image display direction of each video frame may be determined through an existing method. Specifically:

Information about the width w, height h, and rotation angle δ of the video frame may be obtained by analysis. When the rotation angle δ is 0° or 180°, if w>h, the display direction may be designated as the landscape direction; otherwise, the display direction may be designated as the portrait direction. When the rotation angle δ is 90° or 270°, if w>h, the display direction may be designated as the portrait direction; otherwise, the display direction may be designated as the landscape direction.

As can be seen from the above-described embodiment of the method, the video display may be compared with the display direction of the display device, the display direction of the display device may be switched automatically, and displayed images may be scaled, filled, rotated and clipped in the display direction switching process. As a result, video contents may maintain a substantial match to the direction of the display plane, and a smooth transitional display effect may be realized. In addition, original image information may be displayed as much as possible in the case of no black area, such that the viewing experience of users is improved.

Figure 2:
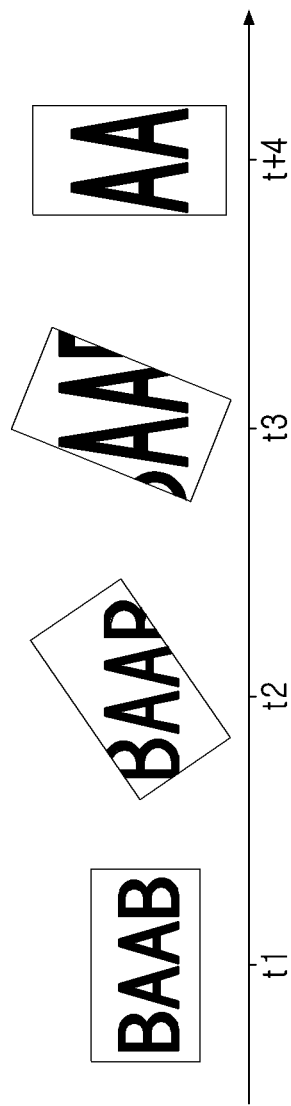
FIG. 2 is an effect diagram of an embodiment of the disclosure applied to the rotation process of a display device.

FIG. 2 is an effect diagram of an embodiment of the disclosure applied to a rotation process of a display device. The illustrated rotation process is conducted over a series of morphing adaption processing times t1 through t4, which may be determined according to a morphing adaption processing frequency; for example, $t2=t1+f_1$, and so forth. For convenience of illustration, it is assumed that the image contents displayed during the rotation process remain unchanged. As can be seen from FIG. 2, the contents displayed during the rotation process of the display device remain consistent with the view angle of users over a series of morphing adaption processing times t1 through t4; that is, no matter whether the display device is horizontal or not, "AA" is displayed as substantially horizontal.

Figure 3:
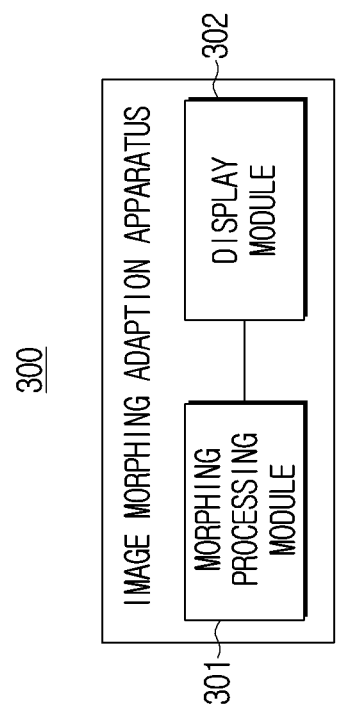
FIG. 3 is a structural diagram of an image morphing adaption apparatus according to an embodiment of the disclosure.

FIG. 3 is a structural diagram of an image morphing adaption apparatus 300 according to an embodiment of the disclosure, which may correspond to the method embodiment illustrated in FIG. 1. The apparatus 300 includes:

A morphing processing module 301 used for processing, by rotating and then clipping, an image to be displayed at each morphing adaption processing time during the rotation process of a display device; and A display module 302 used for displaying the processed image at the morphing adaption processing time.

In the apparatus 300 illustrated in FIG. 3, a rotation angle of the image may be substantially equal to a rotation angle of the display device at the corresponding time, a rotation direction of the image may be opposite to a rotation direction of the display device, the morphing adaption processing time may be determined based on a preset morphing adaption processing frequency, and the morphing adaption processing frequency may be determined by down-conversion based on a current screen refresh frequency.

Corresponding to prior disclosed embodiments, according to an embodiment of the disclosure, an image morphing adaption device may include a processor and a memory.

An application program to be executed by the processor may be stored in the memory, and may be executed by the processor to implement an image morphing adaption method such as the various method embodiments previously disclosed.

The memory may be specifically implemented as different storage media such as electrically erasable programmable read-only memories (EEPROMs), flash memories, or programmable read-only memories (PROMs). The processor may be implemented as one or more central processing units, or as one or more field programmable gate arrays which are integrated with one or more central processing unit cores. Specifically, the central processing units or the central processing unit cores may be implemented as CPUs or memory protection units (MPUs).

It should be noted that various operations, modules, and other features described and illustrated in the above disclosure may be omitted or replaced without departing from the scope of the disclosure. Likewise, the execution order of the operations is not fixed and may be adjusted. Also, the disclosed modules are partitioned by function for the sake of a convenient description. In actual implementation, one module may be implemented as multiple modules, and the functions of multiple modules may be fulfilled by the same module. All these modules may be located in one device or in different devices.

Hardware modules in the embodiments may be implemented mechanically or electronically. For example, one hardware module may include a specially designed permanent circuit or logic device (such as a specific processor, a field programmable gate array (FPGA) or an application-specific integrated circuit (ASIC)) for completing specific operations. The hardware module may also include a programmable logic device or circuit temporarily configured by software (such as a universal processor or other programmable processor) for performing specific operations. Whether the hardware module is implemented mechanically, by the specific permanent circuit, or by the temporarily configured circuit (such as configured by software) depends on the cost and time.

According to an embodiment of the disclosure, a non-transitory computer-readable storage medium may store at least one instruction to be executed by a machine to implement an image morphing adaption method such as the various method embodiments previously disclosed. Specifically, a system or device equipped with a storage medium may be provided, wherein software program codes for fulfilling the function of any implementation in the above embodiments are stored in the storage medium, and the program codes stored in the storage medium are read and executed by a computer processor of the system or device (such as CPU or MPU). In addition, an operating system operated on the computer may complete all or part of actual operations by means of an instruction based on program codes. Program codes read from the storage medium may be written into a memory arranged in an expansion board inserted into the computer or into a memory arranged in an expansion unit connected to the computer, and then all or part of actual operations are performed by a CPU installed on the expansion board or the expansion unit based on the program codes to fulfill the function of any one of the above implementations.

The storage medium for providing program codes may be, but is not limited to, any of a floppy disk, a hard disk, a magnetic disk, an optical disk (such as CD-ROM, CD-R, CD-RW, DVD-ROM, DVD-RAM, DVD-RW or DVD+RW), a magnetic tape, a nonvolatile memory card, and an ROM. In certain embodiments, the program codes may be downloaded from a server computer or a "cloud" storage medium by means of a communication network.

In this disclosure, "illustrative" represents "serving as an instance or example or being used for description", and any one drawing or embodiment described as being "illustrative" should be interpreted as a preferred or more advantageous technical solution. To make the drawings brief, parts relating to the disclosure are illustratively shown in the drawings, and should not be construed as actual structures of products. In addition, to make the drawings brief and easily understood, only one of components with the same structure or function is illustratively shown or marked in certain drawings. In this disclosure, "one" is not intended to limit the number of relevant parts in the disclosure to "only one", and should not be interpreted to exclude the situation that the number of relevant parts in the disclosure is "more than one". In this disclosure, terms such as "upper", "lower", "front", "back", "left", "right", "inner" and "outer" are merely used to indicate the relative positional relations between relevant parts, and should not be interpreted to limit the absolute positions of these relevant parts.

The foregoing description is merely used to explain preferred embodiments of the disclosure, and is not intended to limit the protection scope thereof. Any amendments, equivalent substitutions and improvements made based on the spirit and principle of the disclosure should also fall within the protection scope.

What is claimed is:

1. An image morphing adaption method, comprising:
during a rotation process of a display device, processing, by rotating and then clipping, an image to be displayed at at least one morphing adaption processing time; and
displaying the processed image at the at least one morphing adaption processing time;
wherein a rotation angle of the image is substantially equal to a corresponding rotation angle of the display device at the corresponding time, a rotation direction of the image is opposite to a rotation direction of the display device, the morphing adaption processing time is determined based on a preset morphing adaption processing frequency, and the morphing adaption processing frequency is determined by down-conversion based on a current screen refresh frequency, and
wherein the processing of the image to be displayed comprises:
determining a next morphing adaption processing time for a current morphing adaption processing time according to the preset morphing adaption processing frequency;
acquiring an image to be displayed at the next morphing adaption processing time;

predicting the corresponding rotation angle of the display device at the next morphing adaption processing time; and processing the acquired image based on the corresponding rotation angle.

2. The method according to claim 1, wherein
the predicting the corresponding rotation angle of the display device at the next morphing adaption processing time is based on a current rotation angle and a current rotational angular velocity of the display device; and wherein the processing the acquired image based on the corresponding rotation angle comprises:
calculating a first size according to the corresponding rotation angle, a width of the acquired image-, and a height of the acquired image;
scaling the acquired image according to a preset image scaling ratio to obtain a scaled image;
converting the scaled image into a resized image of the first size;
rotating the resized image in a direction opposite to the rotation direction of the display device according to the corresponding rotation angle; and
clipping the resized image to obtain a clipped image of a second size.

3. The method according to claim 2, wherein the converting of the scaled image into the resized image comprises:
placing the scaled image at a central area of a screen having the first size; and
filling an area uncovered by the scaled image in the screen to obtain the resized image.

4. The method according to claim 2, wherein the calculating of the first size comprises, for the width w of the acquired image, the height h of the acquired image, the corresponding rotation angle θ of the display device, and an angle $\alpha = \tan^{-1}(h/w)$:
calculating a width $W_1$ of the first size according to $$W_1 = w \times \frac{\sin(\alpha + \theta)}{\sin \alpha};$$

and
calculating a height $H_1$ of the first size according to $$H_1 = h \times \frac{\sin(\alpha + \theta)}{\sin \alpha}.$$

5. The method according to claim 2, wherein the clipping of the resized image comprises:
determining a current clip center according to a preset clip strategy; and
clipping the rotated image according to the current clip center with the second size as an image clip size.

6. The method according to claim 5, wherein an image center of the resized image is determined to be the current clip center.

7. The method according to claim 5, wherein a key area of an image of a video frame is detected according to a preset key area detection strategy, the key area being determined to be the current clip center.

8. The method according to claim 2, wherein a width of the second size is substantially equal to the width of the acquired image, and a height of the second size is substantially equal to the height of the acquired image.

9. The method according to claim 1, further comprising:
triggering the rotation process of the display device responsive to detection of a display direction switch request from a user.

10. The method according to claim 1, further comprising:
for a current frame of image to be displayed at a current time, determining whether a current display direction of the display device is consistent with an image display direction of a corresponding frame of image to be displayed after a rotation period, the rotation period being a time needed after the current time for completing the rotation process of the display device; and
responsive to a determination that the current display direction is inconsistent with the image display direction, triggering the rotation process.

11. The method according to claim 1, wherein for the current screen refresh frequency $f_0$, a preset down-conversion coefficient $0<a<1$, and a preset minimum morphing adaption processing frequency b, the morphing adaption processing frequency $f_1$ is obtained according to $f_1 = \max((f_0 \times a), b)$.

12. An image morphing adaption apparatus for a display device, comprising:
a morphing processing module configured to process, during a rotation process of the display device, by rotating and then clipping, an image to be displayed at a morphing adaption processing time; and
a display module used for displaying the processed image at the morphing adaption processing time,
wherein a rotation angle of the image is substantially equal to a rotation angle of the display device at the corresponding time, a rotation direction of the image is opposite to a rotation direction of the display device, the morphing adaption processing time is determined based on a preset morphing adaption processing frequency, and the morphing adaption processing frequency is determined by down-conversion based on a current screen refresh frequency, and
wherein the processing of the image to be displayed comprises:
determine a next morphing adaption processing time for a current morphing adaption processing time according to the preset morphing adaption processing frequency;
acquire an image to be displayed at the next morphing adaption processing time;
predict the corresponding rotation angle of the display device at the next morphing adaption processing time, and
process the acquired image based on the corresponding rotation angle.

13. A non-transitory computer-readable storage medium, having at least one computer-readable instruction stored therein, wherein the at least one computer-readable instruction, when executed by at least one processor, causes the at least one processor to:
during a rotation process of a display device, process, by rotating and then clipping, an image to be displayed at at least one morphing adaption processing time; and
display the processed image at the at least one morphing adaption processing time;
wherein a rotation angle of the image is substantially equal to a rotation angle of the display device at the corresponding time, a rotation direction of the image is opposite to a rotation direction of the display device, the morphing adaption processing time is determined based on a preset morphing adaption processing frequency, and the morphing adaption processing frequency is determined by down-conversion based on a current screen refresh frequency, and wherein the processing of the image to be displayed comprises:
- determine a next morphing adaption processing time for a current morphing adaption processing time according to the preset morphing adaption processing frequency;
- acquire an image to be displayed at the next morphing adaption processing time;
- predict the corresponding rotation angle of the display device at the next morphing adaption processing time, and
- process the acquired image based on the corresponding rotation angle.

* * * * *